United States Patent [19]

Notess et al.

[11] Patent Number: 5,438,659
[45] Date of Patent: Aug. 1, 1995

[54] OBJECT-ACTION USER INTERFACE MANAGEMENT SYSTEM

[75] Inventors: Mark H. Notess, Ft. Collins; Scott J. Warren, Timnath; Tammy Heiserman, Ft. Collins; Michael A. Kingdom, Loveland, all of Colo.

[73] Assignee: Hewlett-Packard Company, Palo Alto, Calif.

[21] Appl. No.: 958,205

[22] Filed: Oct. 8, 1992

[51] Int. Cl.⁶ ............................................. G06F 17/30
[52] U.S. Cl. .................................... 395/155; 395/157
[58] Field of Search ................ 395/155, 161, 156, 157

[56] References Cited

U.S. PATENT DOCUMENTS 5,208,907  5/1993  Shelton et al. .................. 395/155 X

OTHER PUBLICATIONS

Microsoft Windows User's Guide (1990) (Trademark of Microsoft Corporation); pp.: 17-41, 101-113, 115-119, 126-127, 135 & 168.

Objectvision TM (Trademark of Borland International Inc.) 1991, pp. 7-16, 18, 26-68 & 87-146.

Primary Examiner—Heather R. Herndon
Assistant Examiner—Cliff Vo
Attorney, Agent, or Firm—Patrick J. Murphy

[57] ABSTRACT

An Object-Action Manager shields an applications developer from multiple display technologies and development tools and assists the developer in applications user interface creation. The manager includes a parser, an object-list builder, dialog-box builder, a library of access functions and a display handler. The object-list builder and dialog-box builder are used to build user interface screen definitions according to predetermined parameters. The parser reads a developer-defined description file and builds data structures. The object-list builder and dialog-box builder use the data structures to customize the user interface screens for the developer. The library contains functions used during operation of the user interface. The display handler manages interaction between the end-user and the developed application.

15 Claims, 8 Drawing Sheets

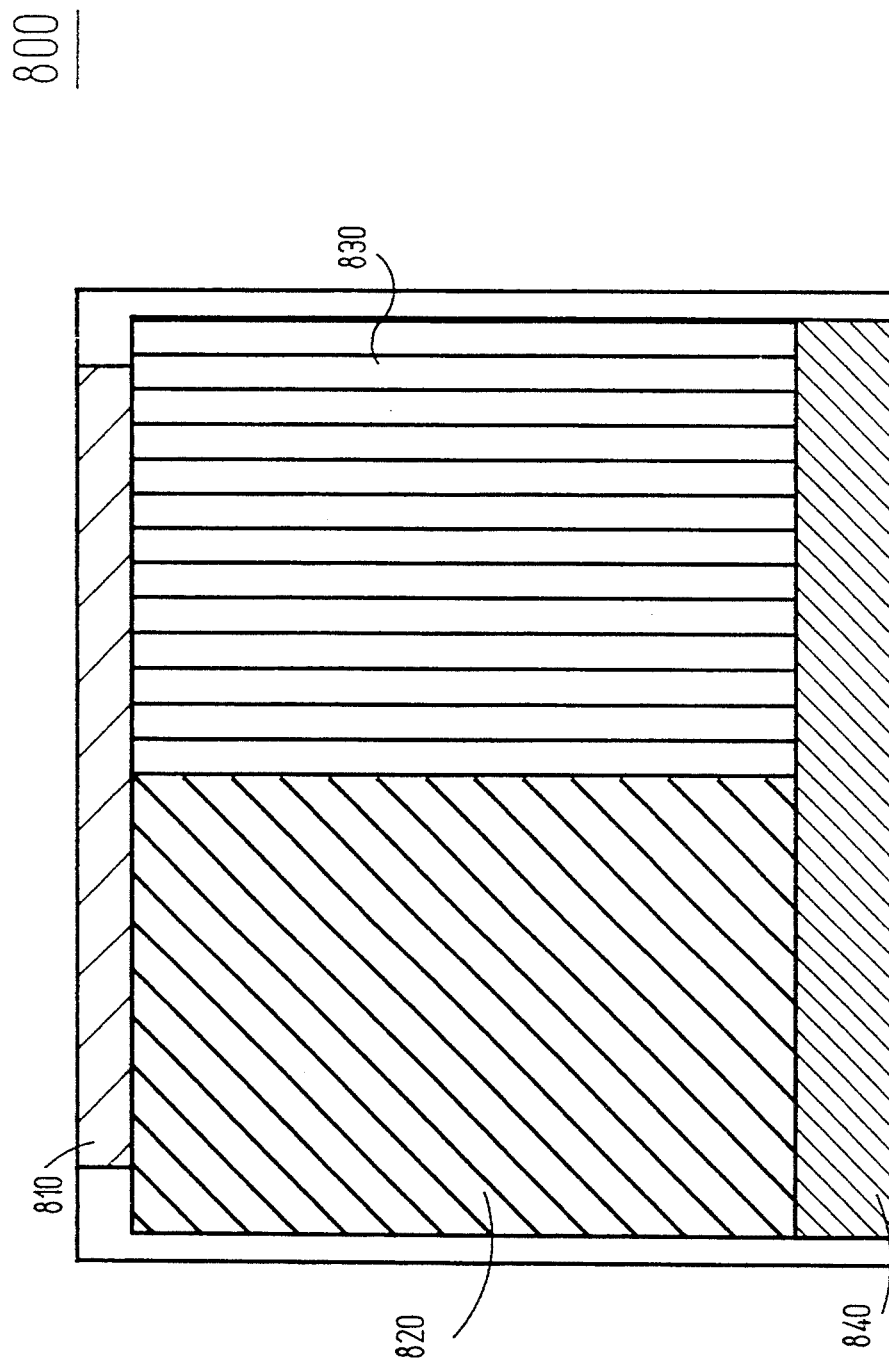

OBJECT-ACTION USER INTERFACE MANAGEMENT SYSTEM

BACKGROUND OF THE INVENTION

1. Field of the Invention

The present invention relates generally to software development tools and more particularly to a high-level, application-class specific user interface development tool.

2. Description of the Prior Art

User interface tools assist software application developers in the design and development of computer applications software. There are two groups that interact with computer applications software. The first group, noted above, are application developers. This group is responsible for creating the software according to design specifications which may be driven by the developers themselves, or the second group—the application software end-users. The relationship between the two groups is dynamic in that each contribute input and feedback to the other.

Typically, these tools are general-purpose. That is, the tools enable the development of a very broad range of user interface styles. One disadvantage is that these tools often contain hundreds of functions in order to be general-purpose. The developer must acquire a working knowledge of most of these functions to use the tool. This leaves the developer in the unenviable position of first learning the intricacies of the tool, which can take weeks or months, before any development can begin.

A second disadvantage of the general-purpose user interface tool, stemming again from the generality, is that the tool does not constrain the developer to use the tool in a way that yields consistent appearance and behavior among the common elements of the application's user interface. Achieving consistency and avoiding arbitrary differences among common elements thus becomes an arduous task of writing and revising style guides and manually reviewing all parts of the user interface to ensure conformance with the style guide. However, style guides are inherently difficult to enforce since the guide is a mere suggestion. There is no mechanism to impose a particular style upon the developer. Further, ensuring user interface consistency is particularly challenging given the myriad options available to the developer in today's user interface tools.

These disadvantages are compounded if the application being developed is large enough to require the efforts of multiple developers. The developers, who often are not user interface designers and may be located at geographically remote locations, must scale the steep learning curve of the general-purpose user interface tool. Each developer arrives at a unique understanding of how to achieve the desired standard style with the numerous graphic and display elements which, in various combinations, define a given user interface application. Further, the developers, each having a unique approach to standardizing the application's style, must coordinate all design and implementation decisions in an attempt to avoid arbitrary inconsistencies in the user interface. Thus, development of large applications with multiple developers requires added care since this situation is inherently disposed to application inconsistencies.

Several general-purpose user interface tools have lengthy development cycles consisting of repeated editing, recompilation, and re-linking of the application before the user interface can be initially viewed or subsequently modified. Because user interface development is highly iterative, rapid prototyping is essential to effective development. Yet many general-purpose user interface tools fail to facilitate rapid initial development of partially functioning prototypes. Furthermore, these tools lack the ability to quickly apply changes to an existing prototype. Without quick feedback, the developer is at a disadvantage during the development cycle.

The aforementioned disadvantages and limitations retard application development and place the usability of the application at serious risk, particularly for large interactive applications. It would be a great benefit if a development tool could be designed to handle the hundreds of functions and myriad style options involved in interface development, while allowing the systems developer more time to concentrate on perfecting the interface consistency and overall performance.

SUMMARY OF THE INVENTION

The present invention overcomes the disadvantages and limitations of the prior art by providing a high-level, user interface development tool. In particular, an Object-Action Manager shields an applications developer from multiple display technologies and development tools and assists the developer in applications user interface creation. Instead of being general-purpose, the Object-Action Manager is application-class specific. That is, the user interface created by the Object-Action Manager allows a user to manage lists of objects, input and modify parameters for performing tasks, and step through complex procedures.

The Object-Action Manager controls the many user interface features which are typically in the hands of several developers. These features include: (1) the interaction paradigm; (2) selection and navigation methods; (3) positioning and labeling of common elements; (4) relative screen layout; (5) error handling; and (6) display technology-specific factors such as fonts and cursor shapes. This control, provided by the Object-Action Manager, facilitates learning and overall user interface consistency.

Generally, the Object-Action Manager comprises a description file interpreter and a library of access functions. The description file interpreter effects the system start-up procedure. In addition, the interpreter reads data files that define the screens to be used in the user interface. These files define the type of objects to be managed, the attributes of those objects, the available actions which can be taken on those objects and the necessary inputs to effect those actions. An advantage of this description file interpreter is the resulting consistency among the application screens that are built and displayed to the end user. By shielding the developer from the underlying system and display technology through the use of a high-level description language, the interpreter decreases the chance for screen inconsistencies typically introduced in conventional development tools.

The library of access functions supplies the developer with routines for accessing the screens defined in the description file, for example. By invoking these routines, the developer can read and manipulate user interface screens. In particular, a value can be read from, or placed into, a designated field on the screen. Other routines allow the developer to display error messages, for example, upon the occurrence of an event.

BRIEF DESCRIPTION OF THE DRAWINGS

FIG. 8 shows a step menu screen map according to the present invention.

DETAILED DESCRIPTION OF THE PREFERRED EMBODIMENT

Figure 1:
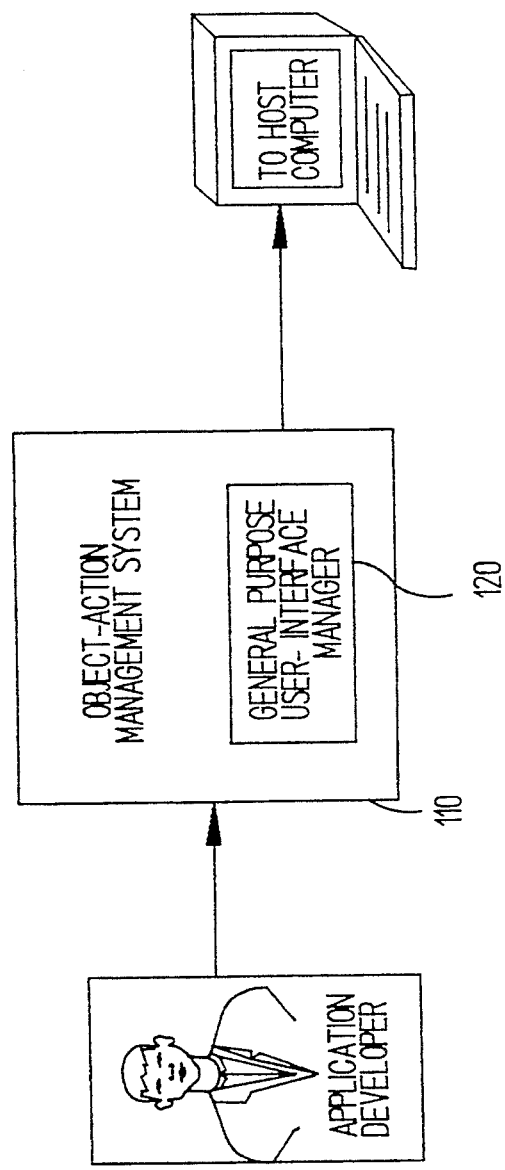
FIG. 1 shows an overview of the Object-Action Manager according to the present invention.

The present invention provides high-level, user interface development tool for developers of system administration tools and similar object management applications such as data base access.

As used herein, the following terms and phrases are defined as follows:

access function:
 a subroutine supplied by the Object-Action Manager for the application developer's use in callback functions; access functions retrieve data from the screens, place data in the screens, or otherwise manipulate the user interface.

add-on list:
 a complex selector typically consisting of a label, a scrollable list, an input region, and a set of push buttons allowing list items to be added, removed, or modified by the user.

application:
 a computer software program; applications discussed herein are additionally interactive applications: they have a user interface.

attribute:
 a characteristic of an object, e.g., a printer object has "name" as an attribute; also, selectors have attributes that the developer can specify to affect the behavior or appearance of the selector.

callback function:
 a subroutine written in a programming language (e.g., the C programming language), which is invoked by the user interface management system when a certain related user action occurs. For example when the user presses the "OK" pushbutton in a task dialog, the "OK callback" function is invoked. Callback functions are supplied by the developer where they are needed.

character-based terminal:
 a computer display device where the basic element of construction is a character (letter, number, symbol, etc.) and where a keyboard is typically the only input device.

control buttons:
 a set of buttons at the bottom of a dialog box; buttons are used for performing a task, dismissing the dialog box, or requesting help.

description file:
 a text file containing the user-interface screen definitions; these definitions use a simple syntax.

developer:
 the person who creates an application dialog box:
 a screen allowing data entry or data viewing, with a set of control buttons at the bottom; types of dialog boxes in Object-Action Manager include task dialogs, step menus, message boxes, and view menu dialogs.

graphical user interface:
 a user interface where the fundamental element of construction is the pixel (a dot of color) and where devices typically include a pointing device such as a mouse or trackball in addition to a keyboard; typically, graphical user interfaces make use of screens, dialog boxes, push buttons, menubars, and the like.

interaction paradigm:
 a model of how a user interacts with an application, e.g., the object-action paradigm. In the object-action paradigm the user first selects an object and then picks an action to perform on the selected object.

menu:
 a list of words or phrases, from which one (at a time) may be selected by the user to accomplish some application action.

menubar:
 an area at the top of a screen containing words which, if selected, display a list of choices (pull-down menu) from which the user may pick; menubars provide hierarchical menu systems.

message box:
 dialog box containing only a message and an appropriate set of control buttons.

object:
 a data item, typically with multiple attributes.

Object-Action Manager:
 a high-level, application-class- specific user-interface development tool.

object-list:
 a textual display of the attribute values of a data item; items in an object list can be selected, filtered, sorted, or otherwise rearranged by the user.

object-list screen:
 an object-list screen allows a user to view a list of objects, select objects, and perform actions (via an "Actions" menu), which may or may not affect the selected objects, usually contains a screen with a menubar, a status area, and an object-list.

option menu:
 a labeled button selector which, when activated, displays a menu of choices; the selected choice replaces the label on the button, indicating the current choice.

push button:
 a word or phrase with the appearance of a button, which, when activated by the user, accomplishes some user interface operation.

radio buttons:
 a type of non-scrolling, mutually-exclusive selection list, where when the user picks one option (by pressing a button to the left of a label), the other options are automatically deselected, thus allowing only a single selection at a time from a limited number of choices.

screen:
 a bounded display of user interface information and controls; graphical user interfaces typically allow screens to be moved, re-sized, or otherwise manipulated by the user.

selection list:
    a selector allowing single or multiple selection of items from a small or large number of choices. This can be represented as a group of toggles, a set of radio buttons, an option menu, or a scrolling listbox, depending on the selection policy, the number of items, and the available screen space.

selector:
    an element of the task area of a task dialog that allows the user to input data or view information. Examples of selectors are: text edit, static text, push button, add-on list, selection list, toggle, read-only list.

static text:
    a textual, non-scrolling selector which cannot be manipulated by the user.

step menu:
    a dialog box providing a control for each step of a complex procedure and adjacent status areas for keeping the user appraised of his/her progress.

subarea:
    a set of definitions which include a type of object, the object's attributes, the actions that can be performed on that object.

task dialog:
    a dialog box, specified by the developer, which allows the user to input task parameters or view task information; usually contains a task area and control buttons.

text edit:
    an editable text selector with an adjacent label.

toggle:
    a selector which the user can set on or off, independent of the settings of other toggles. A toggle is typically represented as a button to the left of an associated label.

user:
    the person who uses the application the developer creates.

user interface:
    that part of an application which the end user interacts with in order to use the application.

FIG. 1 shows a system overview. The applications developer interacts with the object-action management system 110, which in turn accesses and manipulates the general purpose user interface manager 120, which is embedded in the object-action management system 110. In a preferred embodiment, the general purpose user interface manager 120 is Dialog Manager on an OSF/Motif software platform. Dialog Manager is available from Informationssysteme für computer-integrierte Automatisierung GmbH (ISA), Stuttgart, Germany. OSF/Motif is available from Open Software Foundation, Inc., 11 Cambridge Center, Cambridge, Mass., 02142. Other general purpose interfaces such as the X Windows System may be used, with slight modifications to the Object-Action Manager 110, without departing from the spirit and scope of the invention. The object-action management system 110 shields the developer from the intricacies of the general purpose user interface manager 120 thereby reducing the learning curve and reducing the chance for interface discrepancies. This facilitates rapid development of prototypes and application-specific user interfaces.

Figure 2:
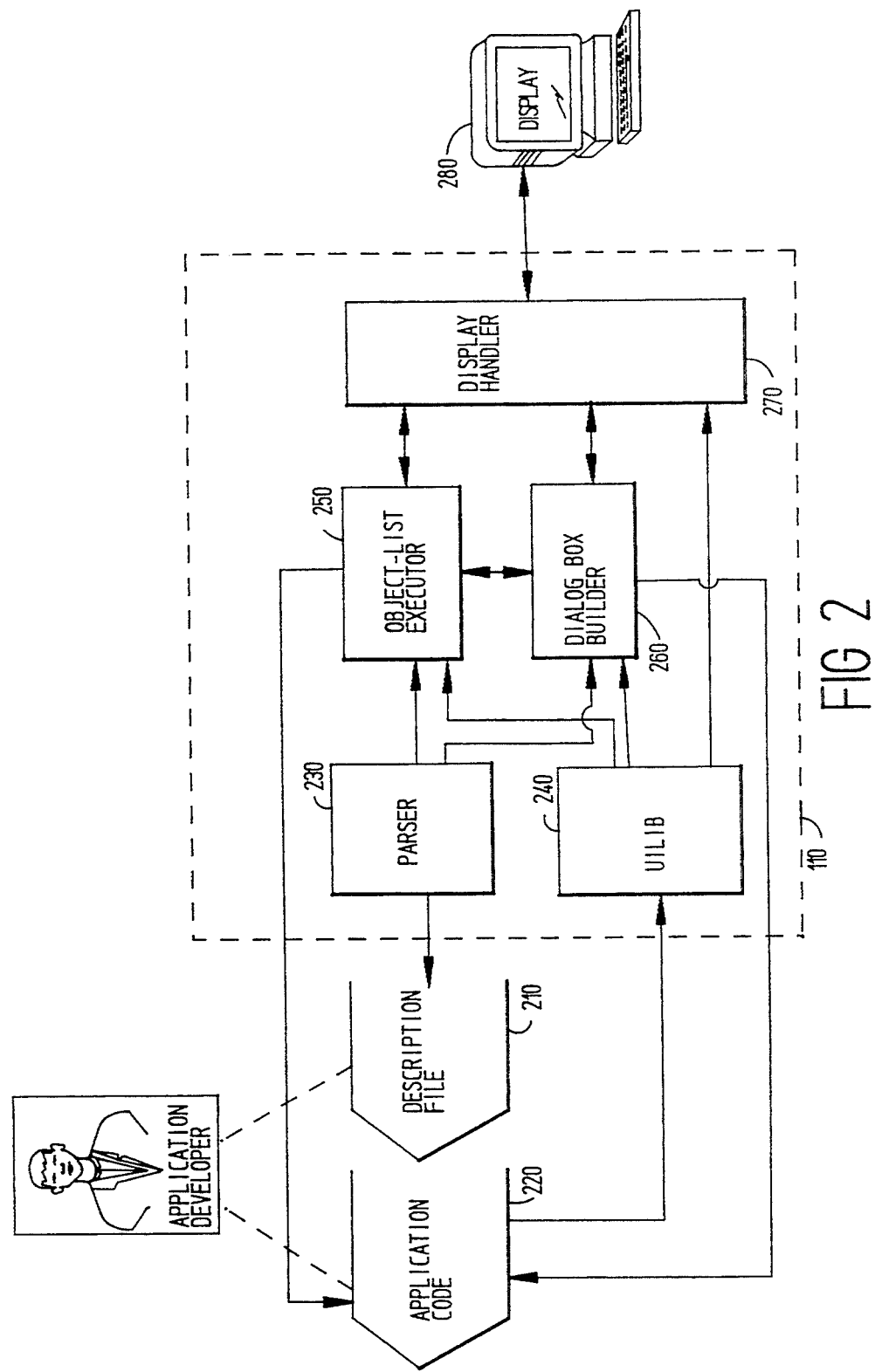
FIG. 2 shows a more detailed illustration of the Object-Action Manager.

FIG. 2 shows the functional control flow of the Object-Action Manager 110. The applications developer creates a user interface application by defining interface screens within a description file 210. Programming routines, located in an application code 220 file, are also created by the developer for manipulating the interface screens. The description file 210 and the application code 220 are both created using the high-level application programming interface (API) provided by the Object-Action Manager 110. This high-level API, which has a simple definition syntax (see Appendix A), facilitates user interface application development. The definition syntax is less complex than the syntax provided by general-purpose user interface management systems. Maintaining this high-level API between the applications developer and the Object-Action Manager 110 is critical to the success of the invention.

The description file 210 contains the user interface screen definitions. A feature of the Object-Action Manager 110 is the user interface paradigm supported. This interface (which is described in more detail with respect to FIGS. 4–8) comprises three components: (1) the object-list; (2) the task dialog; and (3) the step menu. Briefly, the user manages objects, which are designated by the applications developer in the description file 210, through the object-list interface. The task dialog interface processes parameter inputs entered by the user for specified actions and functional steps. The step menu interface screen provides a controlled manner for performing complex procedures.

The developer also specifies the following types of information (not an exhaustive list) while defining the three screen types: element identifiers (required)—these identifiers can be used in application code to refer to the screen elements and can also be used within the description files as variables, callback names (optional)—these can be used where needed, default values (optional), help identifiers (optional), element size (optional)—the object-list manager provides a default size.

In addition to the description file 210, the developer creates application code 220 specific to the user interface application. Another feature of the Object-Action Manager 110 is the ease in which the application code 220 can be created. The developer can take advantage of access functions located in the user interface library (Uilib) 240 by including these functions when creating the application code 220. Since Uilib 240 contains many access functions such as selector routines and message routines, overall application development time is decreased. More specifically, the Uilib 240 provides functions that read data from screens, put data on screens, invoke new screens, or otherwise manipulate the user interface. Uilib 240 also provides a simple means of displaying messages, including (but not limited to) confirmation, information, error and progress status messages. Once the developer decides what objects can be displayed and selected by the user in the description file 210, any object manipulations or other functions are defined within the application code 220. For example, the developer may specify a group of users as the object which will be displayed and selected. The description file 210 contains the necessary information to define the group (for example, names, attributes), while the application code 220 contains the necessary functions to manipulate the group, such as setting user privileges.

The parser 230 contains the start-up procedure for the Object-Action Manager 110. In addition to initializing the system, the parser 230 accesses and interprets the description file 210, creating data structures which are used by the object-list executor (OLE) 250 and the dialog box builder (DiBB) 260 to build user interface screens. An important feature of the Object-Action Manager 110 is the late binding convention employed by the parser 230. Instead of creating data structures through a compilation or similar step, all data structure creation is performed at run-time. This decreases prototyping time by providing the developer with immediate feedback upon initializing the interface. Additionally, late binding facilitates iterative development of the interface because changes are quickly applied to the prototype. The net effect of the late binding convention is decreased development time for the application.

Interface screens are built and maintained by the object-list executor (OLE) 250 and the dialog box builder (DiBB) 260. The OLE 250 creates object-list screens (see FIG. 4) according to the description file 210. Additionally, the OLE 250 processes events generated by the user at the display handler 270. Among the structures included in an object-list screen are an Action menu containing a list of actions to perform on selected objects, and a View menu through which the user can customize the display of objects on the object-list screen.

The DiBB 260 is responsible for building task dialog and step menu screens and processing associated events. Data structures created by the parser 230 are used by the DiBB 260 to build task dialog screens and step menu screens (see FIG. 5 and 8, respectively). The developer can modify values in the DiBB data structures, and thus affect application behavior, through the use of access functions in the Uilib 240.

The Object-Action Manager 110 will begin with whatever screen is defined first in the description file 210. For example, if an object-list screen interface is the first defined, the OLE 250 is invoked upon initialization of the application to build the object-list interface. Subsequently, the DiBB 260 is invoked only when an interface screen other than an object-list screen is actually needed, not when the parser 230 interprets the description file 210. This scenario is in accordance with the late binding convention discussed above. Furthermore, this scenario can be altered so that a dialog screen interface is the first screen to be displayed upon initialization of the application.

The display handler 270 manages communications between the host computer display 280 and the Object-Action Manager 110, and more particularly, Uilib 240, the OLE 250 and the DiBB 260. In a preferred embodiment, the host computer is an HP 9000 computer available from Hewlett-Packard Company, a California corporation having a place of business at 3000 Hanover Street, Palo Alto, Calif. 94304. Some possible examples of a display 280 include (1) a character-based terminal; (2) a workstation graphics display; and (3) a PC graphics display. Indeed, any display technology can be employed as the display 280 and in each instance, the display handler 270 accommodates any platform-specific protocol.

Figure 3:
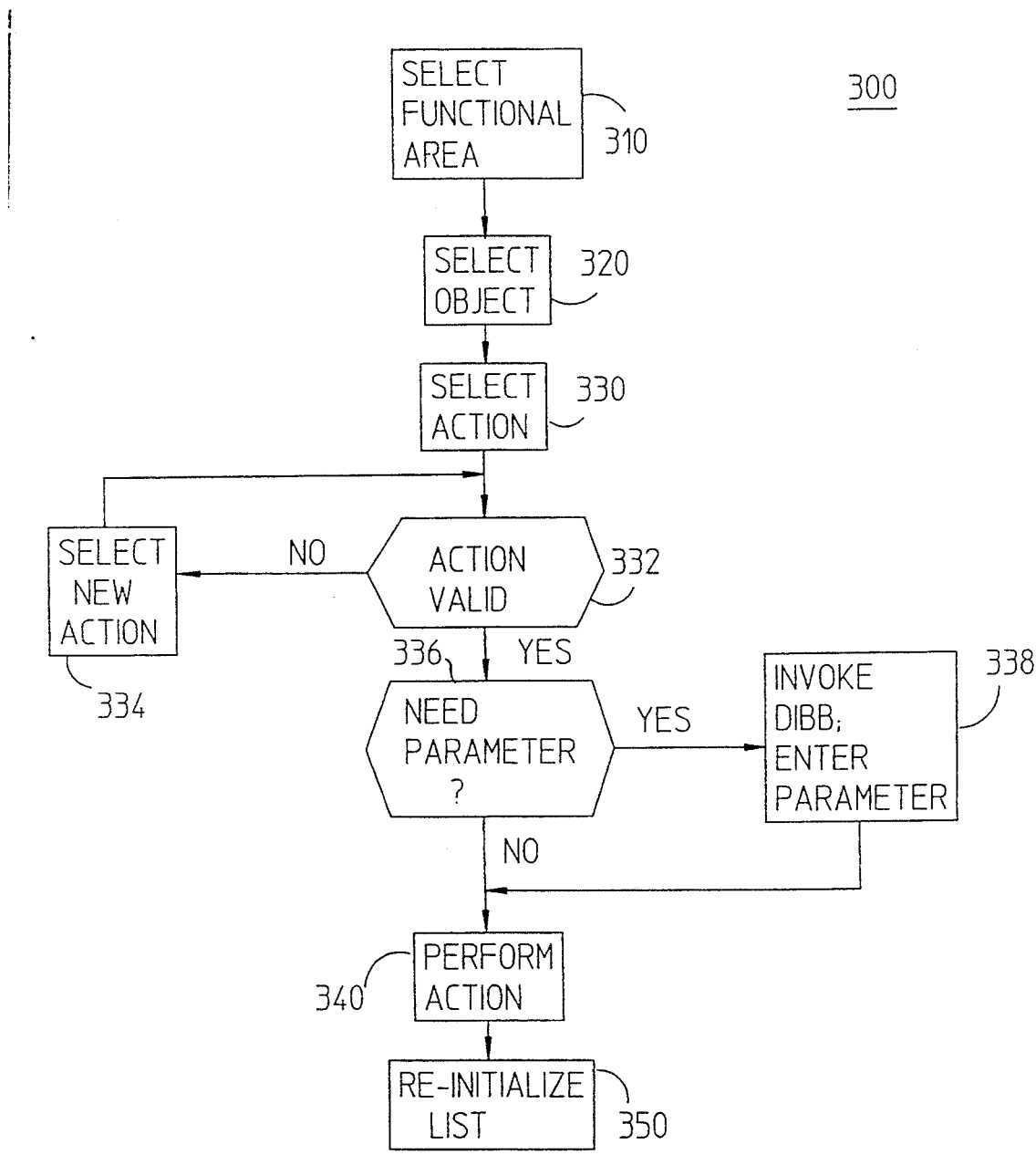
FIG. 3 shows the functional flow diagram of the object-action paradigm according to the present invention.

FIG. 3 shows a flow diagram of the object-action paradigm employed by the Object-Action Manager. Where an object-list screen is defined first in the description file, the user is required to select which functional area 310 to display before any object manipulation can take place. The functional area, or subarea, will contain a list of objects and associated attributes. The user may then select an object 320 from the displayed functional area. Once this object is selected, the user may then select an action 330 to be performed upon the selected object. If the action is not valid, the Object-Action Manager will display an error message. The user will then enter a new action. If a parameter is needed to effect the action 336, the Object-Action Manager will invoke a dialog task interface screen which will wait for the user to enter the required parameter 338. Finally, the action, with the proper parameter(s), will be performed 340.

Figure 4:
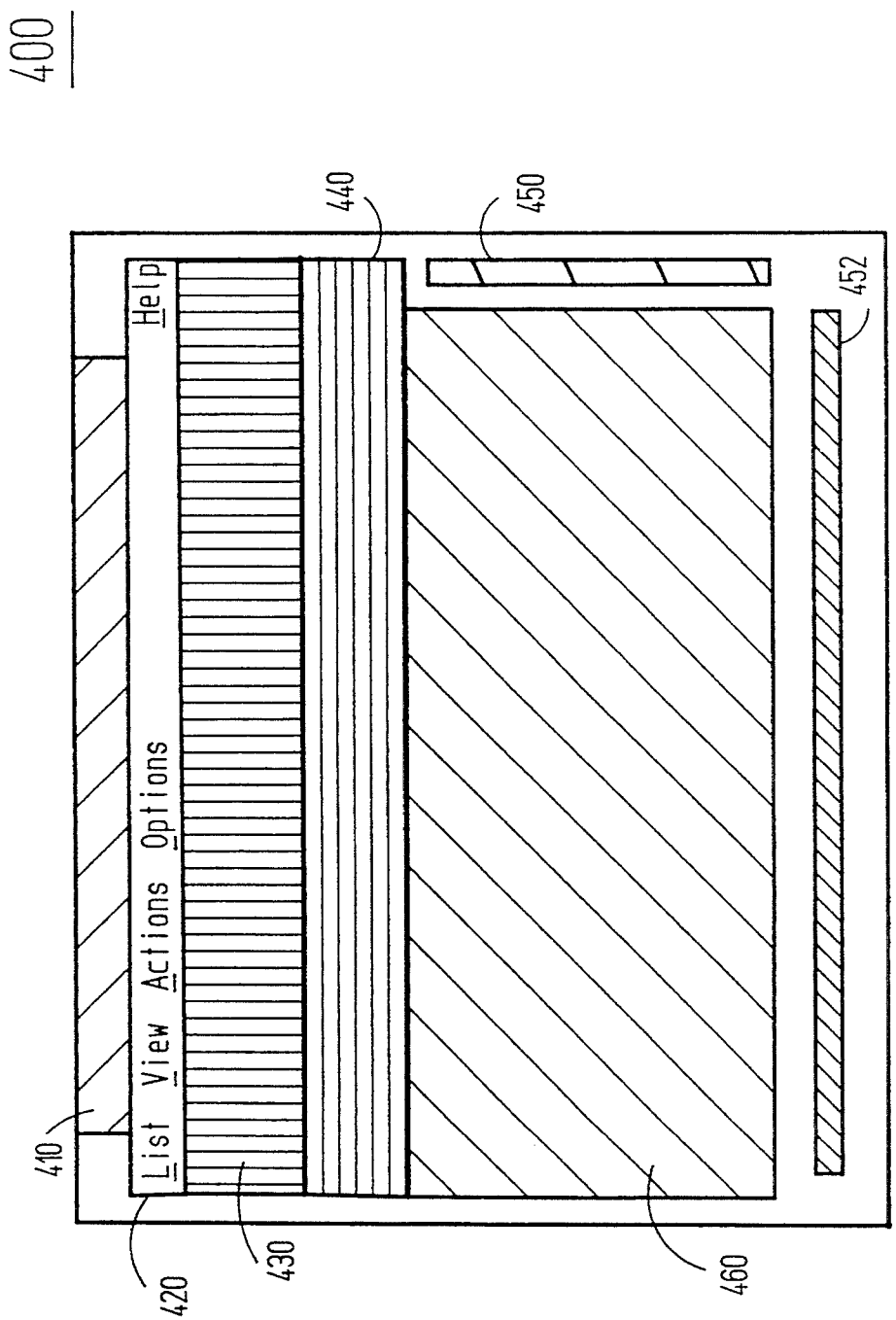
FIG. 4 shows an object-list screen map according to the present invention.

FIG. 4 shows an object-list screen map. While it is not required, the object-list screen 400 can be the first screen displayed when the Object-Action Manager is initialized. Generally, the object-list screen 400 provides list manipulation capabilities and comprises a titlebar 410, a menubar 420, a status area 430, a column labeling area 440, an object-list region 460, and scroll bars 450, 452.

The object-list region 460 displays the objects being managed. If the objects being displayed require a region larger than a default region size, scroll bars 450, 452 allow the user to see the entire list by scrolling either vertically or horizontally. Typically, each object will have a set of attributes which may, or may not, be displayed initially with the associated object. An applications developer may define private attributes that are not visible or accessible to the end user. Those attributes displayed will have appropriate headings. The applications developer initially decides, within the description file, what attributes to display. The user, applying a variety of options in a View menu located on the menubar 420, can then alter the display by suppressing some attributes, for example.

The menubar 420 is unique to the object-list screen 400 (that is, task dialog and step menu interfaces have no menubar) and provides control for object manipulation. The menubar 420 comprises a List menu, a View menu, an Action menu, an Options menu and a Help menu. The List menu provides control over a subarea, or list of objects and its associated actions. In a preferred embodiment, the menubar 420 may also include a Scope item which facilitates management of multiple computer systems simultaneously. The Scope item accepts multiple system names that when an action is subsequently performed, that action will apply to the designated computers equally.

A feature of the Object-Action Manager is the View menu. The user can customize the object-list region 460 through this interface item. That is, the View menu has options that, when selected by the user, manipulate the object list by filtering out any number of objects, sorting the objects, or arranging the columns. Each of these view items has an associated dialog screen, provided by the Object-Action Manager, which controls the user's manipulations. A filter dialog screen allows the user to view a subset of the object-list based on a selected attribute value such as listing printers that are active. A columns dialog is provided to re-format the object list columns with respect to the object attributes. A sort dialog sorts the object list based on user-prioritized attributes in either an ascending or descending manner. Additionally, the user has the option to save a changed view as a default view so that upon re-initialization of the Object-Action Manager, the saved view will be recalled. Since the View menu is provided by the Object-Action Manager, there is no programming required from the applications developer to effect this feature.

The Actions menu of menubar 420 contains actions which can be common to all subareas or specific to a designated subarea. A subarea defines a set of objects and actions associated with those objects. Each subarea defined will appear on the List menu. An action may be either performed directly upon a selected object, or a group of selected objects, or the action may require confirmation or parameters before the action is executed. Where intermediate user interaction is required, to provide action confirmation for example, a task dialog screen interface will be called by the action to accept such confirmation. When an action is not needed, the Object-Action Manager will dim the specific action on the Action menu so that the user cannot select it (e.g., the remove action when no objects are currently selected).

As mentioned above, a subarea defines a set of objects and associated actions. The applications developer can define a plurality of subareas for the object-list screen 400. Each subarea has a label attribute which defines the text string that will appear in the List menu and is also used by the Object-Action Manager to indicate, in the status area 430, which list is currently displayed on the object-list screen 400. A subarea callback initializes the object list region 460 with subarea objects, the status area 430 with the appropriate labeling, and the Actions menu in the menubar 420 with subarea-specific actions. The object list region 460 can also be initialized by a command.

Another feature of the object-list screen 400 subareas is the subarea table definition. The applications developer provides each subarea with a table definition. The table definition consolidates all the relevant information needed by the ObjectAction Manager to display a set of objects with associated attributes.

For example, an application for managing printers could contain two subareas, one for printers and one for print requests. For the printers subarea, the object attributes can be request name, status, type and location. The actions for this subarea could be "add local printer," "add remote printer," "add network printer" and "start up/shut down print spool." For the print requests subarea, the object attributes can be request identification, owner, priority, file and size. The associated actions could be "cancel request" and "start up/shut down print spool." The "start up/shut down print spool" would be common to both subareas.

The object-list screen 400 also accommodates a hierarchical list of objects. Objects displayed on the initial object-list screen 400 actually represent lists of objects. Once an object from this initial list is selected and "opened," the hierarchical list within this selected object replaces the initial list of objects displayed on the screen 400. Hierarchical lists can either be homogeneous or heterogeneous with respect to the object's attributes and the associated actions. Homogeneous hierarchies have no effect on the Actions menu or the columns displayed. Heterogeneous hierarchies may have different Action menu items at each level of the hierarchy. Additionally, the columns specifications are unique to each level since the list differs with respect to the attributes. The Object-Action Manager tracks the navigation of the hierarchical list and provides a field which indicates what level the user is currently viewing as well as where the user has traversed.

Figure 5:
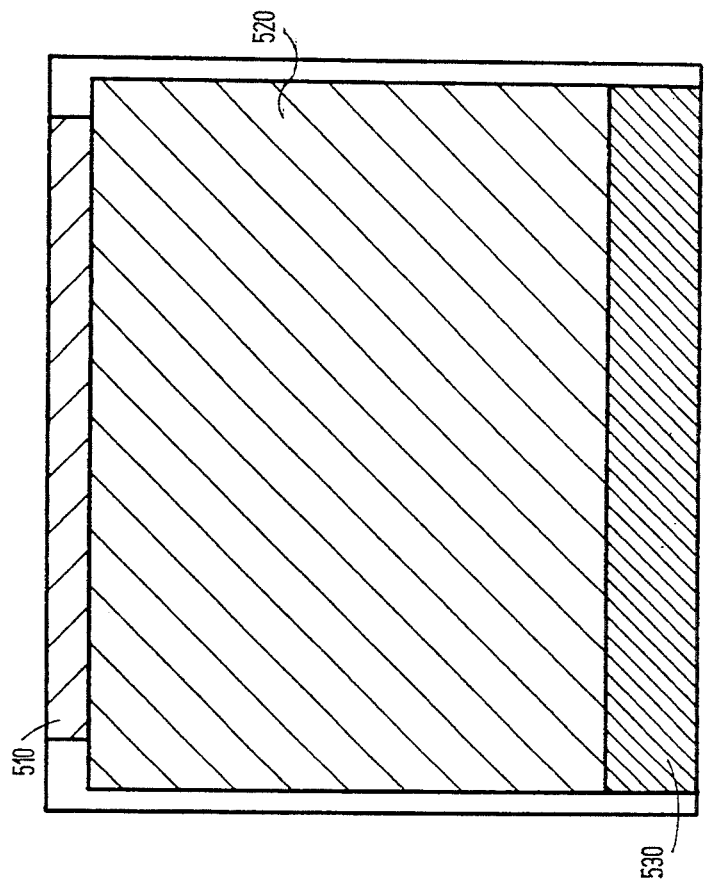
FIG. 5 shows a task dialog screen map according to the present invention.

A task region dominates the task dialog screen shown in FIG. 5. This task region 520 accommodates a wide variety of selectors as will be discussed more fully below. The task dialog screen 500 is usually invoked when the application calls for additional input from the user. In particular, the task dialog screen 500 appears when the user selects an action from the Actions menu on the object-list screen (see FIG. 4) and the action selected requires parameters to be specified or approved.

A task dialog screen 500 may be nested within another task dialog screen. In this instance, a task dialog screen 500 is invoked when the user selects an option within an already displayed task dialog screen and this selected option requires parameter input. Still further, a task dialog screen 500 can be called from a step menu screen (see FIG. 8).

A task dialog screen 500 comprises a titlebar 510, the task region 520 and a control area 530. The titlebar 510 indicates what task has been invoked; it provides confirmation that the user selected the proper task from a previous area. The control area 530 contains various control buttons, including closing the dialog screen 500, performing specified tasks, and accessing an on-line help facility.

There are four types of task dialogs: (1) read-only; (2) standard; (3) repeatable; and (4) default-ok. Read-only task dialogs are for the display of information only. That is, no real "task" or modification is performed and, consequently, the control area 530 typically has one control button to close the dialog and a second control button for invoking help. Where the user does not want or need to repeat a specified task, a standard task dialog screen 500 is displayed. The control area 530 of this screen allows the user to perform the task or cancel; the screen is closed upon either action. A repeatable task dialog screen 500 is displayed where the user may need to perform a task multiple times. In this instance, the control area 530 comprises a control button which will allow the user to perform the task without closing the dialog. The user can enter a parameter and press the return key to perform the task through a default-ok task dialog. While the control area 530 of this screen contains cancel, help and OK buttons, the OK button need not be pressed. The task is performed and the task dialog screen 500 is closed when the user presses the return key, which automatically "presses" the OK button. This obviates the need for additional user interaction, such as pressing a "close" or j"OK" button.

As mentioned above, the task region 520 of the task dialog screen 500 is very flexible. The Object-Action Manager accommodates a variety of task dialogs. These tasks are characterized by selectors which are used to construct the task dialog screen 500, and more particularly, the task region 520. A selector can be a user interface element which accepts task parameter inputs from the user, for example. These selectors provide the means for interacting with the application. Other selectors are information-only in nature. The task dialog screen 500 must have at least one selector to be built.

In addition to the selectors used to construct a task dialog screen 500, the Object-Action Manager provides layout constructs. These constructs, accessible by the applications developer, provide custom control over the task dialog screen's layout. An important feature of these layout constructs is the high-level control provided to the applications developer. For example, a skip_line construct is provided to add blank lines to the task dialog screen by simply invoking the construct; there is no need to count pixels to effect screen layout. If no layout constructs are used, the Dialog Box Builder lays out the selectors sequentially without overlaps, top to bottom.

In this example, the Object-Action Manager uses seven selectors: (1) static text; (2) text edit; (3) toggle; (4) push button; (5) read-only list; (6) selection list; and (7) an add-on list selector. However, this list is not exhaustive. The task dialog screen 500 can be built with other selectors which are well known in the art (for example, a slider selector) or those selectors yet to be discovered. A feature of the object action manager is that the selectors have been designed to have an optional attribute. If the application developer flags a selector as optional, then the user does not have to supply a value for the task to proceed. The task can only proceed after each input to the selectors is validated.

Figure 6:
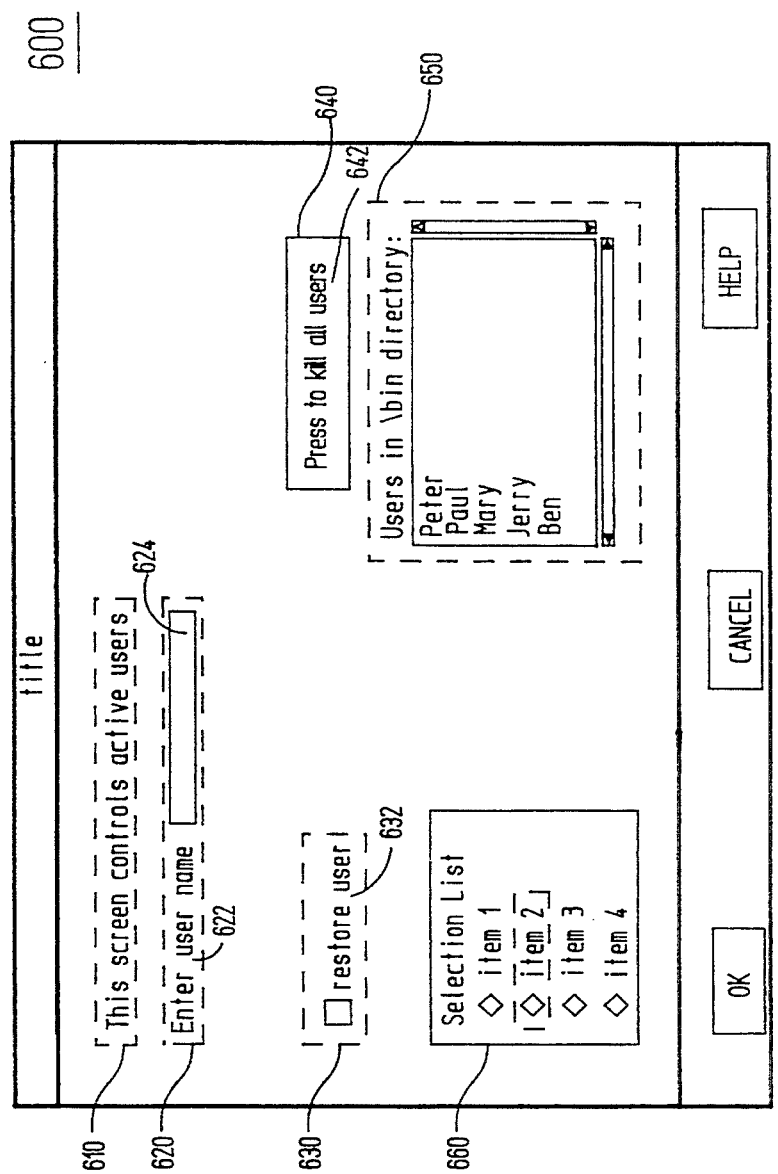
FIG. 6 shows an example of a task dialog screen.

FIG. 6 shows an example of a task dialog screen interface 600. A static text selector 610 defines text in a task dialog which is not accessible by the user. This text is typically informational in nature and can be instructional comments, for example. The length of the text string is defined by the length of the actual text within the description file. The contents of the static text selector 610 may be changed via a Uilib function.

A text edit selector 620 provides an editable field which accepts inputs from the user. This selector 620 is used where the application requires textual input from the user, for example. The text edit selector 620 comprises several attributes including a label field 622, a help attribute (not shown) and an input field 624 and associated specifications. The label field 622 may be descriptive in content (that is, describing what type of input or parameters the text edit selector 620 is looking for) or it may be left blank. Additionally, the label field 622 may be a push button which, if pressed, displays another dialog interface screen listing valid choices for the text edit selector 620. When the user selects an item and presses "OK," the Object-Action Manager places the selected item in the input field 624. The help attribute provides user guidance related to the particular text edit selector and only appears either when the user presses the "HELP" button. Input field specifications include the input format required, the width of the input field and the maximum number of characters accepted. Other field specifications include an initial visibility of the input field attribute. This attribute is particularly useful when the user must enter sensitive data, such as a password, and the contents are to be hidden.

An important feature of the text edit selector 620 is the validation callback attribute. This attribute ensures that the user has entered a proper input to the text edit selector 620. The validation callback attribute can be either a system command or a callback function that is defined by the applications developer.

The toggle selector 630 provides a check box which can be turned on or off. The toggle selector 630 typically represents state information relative to some aspect of the application. For example, a toggle selector may be used to control the on/off state of a tape drive rewind. Label field 632, help attribute (not shown) and toggle state are among the different attributes for the toggle selector 630. The developer may also dim the toggle; that is, the toggle's selectability may be disengaged when the developer does not want the user changing the toggle's state.

The push button selector 640 provides a button which, when selected or "pressed," initiates a specified action. In addition to the label field 642, help and visibility attributes, the push button selector has a callback attribute that identifies the operation to be performed upon pressing. This operation may be a command, function or identifier of a task dialog to display.

The read-only list selector 650 presents the user with information that, except for scroll bar manipulations, cannot be modified. This selector is particularly useful where the user may want a list of users who are currently logged onto a system, for example.

The selection list selector 660 allows the user to select one or more items from a list. A feature of the selection list selector 660 is the various representations that may be used in displaying the selection list such as toggles, radio-buttons, option-buttons and a list box. The Object-Action Manager will automatically choose which representation will be used based on the selection list selector 660 definition. For example, where the number of items is static, there are 6 or fewer choices, and only one item may be selected at a time, the Object-Action Manager will use the radio-buttons representation for this particular selector. However, the applications developer has the ability to override this default scheme by explicitly defining the representation within the selection list selector 660 definition.

Figure 7:
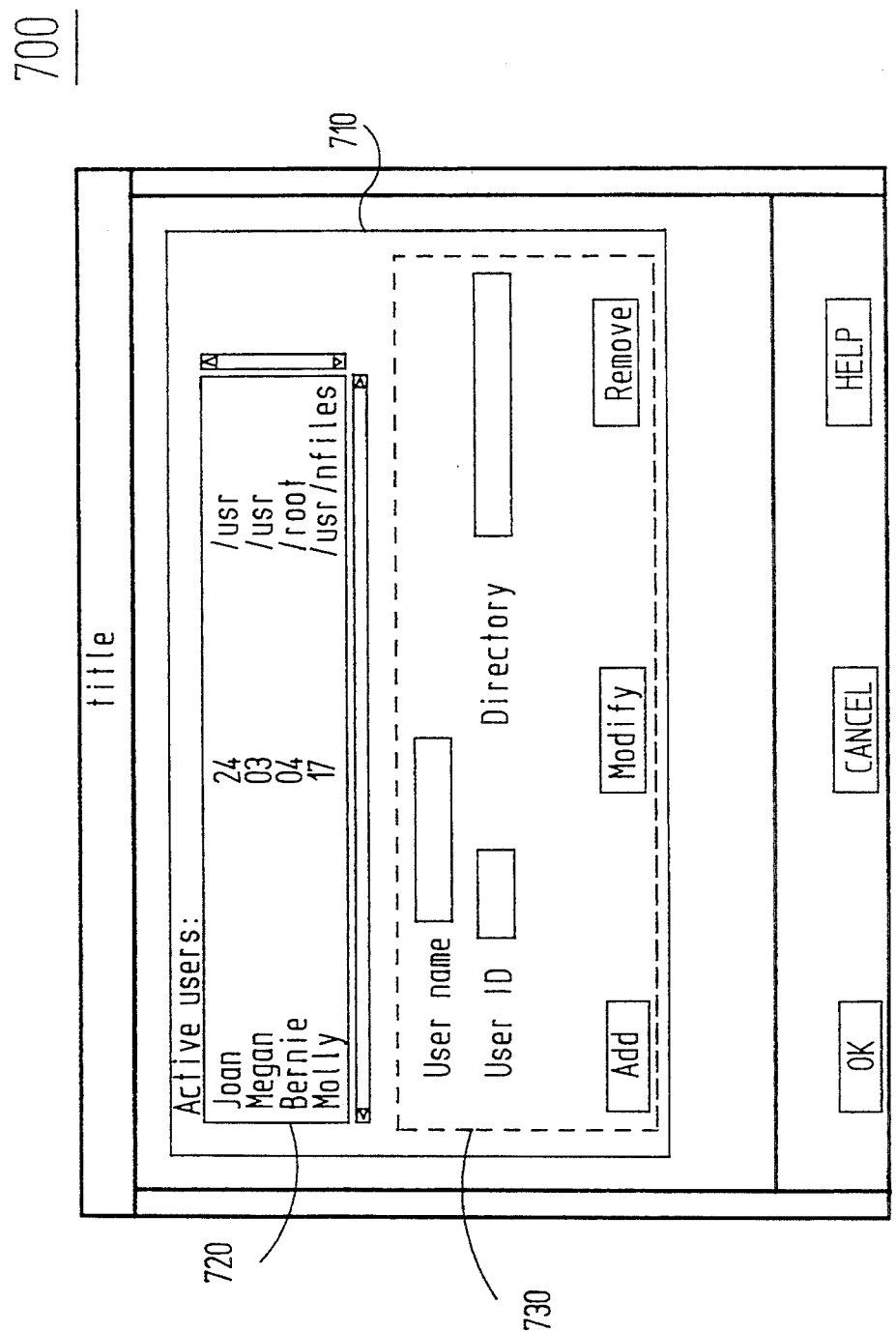
FIG. 7 shows an example of a task dialog screen having an add-on selector.

In FIG. 7, a second example of a task dialog screen interface 700 is shown. A feature of the task dialog interface is the add-on list selector 710 which provides the user mechanism to manipulate a list of objects within the task dialog interface. The user may add items to the list, remove items from the list or modify items on the list by selecting the appropriate button. The Object-Action Manager constructs the add-on list selector 710 by using the combination of a selection list selector 720 and an input region 730. The selection list selector 720 is essentially the same as the selection list selector discussed above in conjunction with FIG. 6. The applications developer can restrict which actions are valid within the add-on list selector 710. For example, the developer may set a flag which activates only the modify button when it is advantageous to prohibit the user from adding or removing a list item.

The add-on list selector 710 is designed so that each time the user selects an item in the selection list selector 720, the input region 730 is automatically updated with the appropriate information. The applications developer may define an initial set of list items with one or more attributes to be displayed in the list. Consequently, the input region 730 will correspond to these attributes and, when the user selects an object, each associated item will be accordingly displayed.

The input region 730 comprises a set of selectors. These selectors may be a static text, a text edit, or a selections list selector (see discussion above with respect to FIG. 6). While the input region 730 is automatically updated when the user selects an item from the selection list 720, the converse is not true. After the input region 730 is updated, an intermediate action, such as pressing a control button, must be taken before the selection list 720 is updated.

An important feature of the Object-Action Manager is now discussed with respect to FIG. 8, wherein a step menu map is illustrated. The step menu interface 800 is utilized when the user must perform a complex task and it is advantageous to "step" the user through the task. Generally, the step menu 800 is a special-purpose task dialog interface where the only selectors used are push button and static text. The step menu 800 comprises a titlebar 810, a push button control region 820, a static text region 830, and a control area 840. The titlebar 810 contains the relevant information to identify the specific task to be performed by the step menu 800. The push button control region 820 contains the relevant steps of the task, one button per step. The static text region 830 may contain instructional comments for the user or it may be used to display status information (for example, indicating what steps have already been performed).

The applications developer may specify when the steps in the task take effect. That is, the step menu 800 may be either designed so that each step must be performed before the state of the application is modified, or designed so that the state of the application is changed as each step is performed. In the first instance, the application must cache the information necessary to make every change when the user finally presses the OK button of the step menu 800.

While the present invention has been illustrated and described in connection with the preferred embodiment, it is not to be limited to the particular structure shown. It should be understood by those skilled in the art that other modifications and variations may be possible in light of the above teachings. For example, object lists can be represented in forms other than a table of textual information such as pictorial representations of the objects and associated attribute bar graph representations.

---

Appendix A - Description File Grammar Specification
This appendix shows an example of an Object-Action Manager description file syntax. Words in bold font represent key words in the description file language.

Basic definitions:

'string' - arbitrary text inside double quotes
    'identifier' - same convention as C except 25 character max, case insensitive
    'func_name' - same conventions as C
    'number' - group of digits, > 0 (decimal system used; not Roman numerals)
    '|' - represents two or more possible choices Beginning of description file:

```
start:
    me_first_func object_list_def
    me_first_func task_dialog_def
    me_first_func step_menu_def
me_first_func:      (0 or 1)
    execute_me_first func_name() /* function */
```

Object list:

```
object_list_def:
    object_list_screen identifier { object_list_guts }
object_list_guts:
    label string
    exit callback func_name() /* function */
    statuses
    subareas
    actions
statuses:       /* 0 or more */
    status_item identifier
    label string
    default string
    width number | width *
subareas:       /* 1 or more */
    subarea identifier { subarea_guts }
subarea_guts:
    label string
    help identifier
    mnemonic string
    entry callback func_name() /* function */
    table_def
    actions
table_def :
    table { table_guts }
table_guts:     /* 1 or more */
    init func_name() | init string   /*function | command*/
    attr identifier { attr_guts }
attr_guts:      /* 1 or more */
    label string
    column number
    justify left | justify right
    width number | width *
    type alpha | type numeric /* used for sorting */
    key             /* used in primary key column */
actions:        /* 0 or more */
    action identifier { action_guts } | separator
action_guts:    /* 1 or more */
    label string
    mnemonic string
    action_spec
    action_option
action_spec:
    do func_name() | do string | do identifier | { action_guts } /*function | command | window
| cascading actions*/
action_option:  /* 1 of */
    radiobutton on | radiobutton off
    toggle on | toggle off
    gray when no selections | gray when multiple selections | gray when no or multiple
    selections
```

Task Dialog:

-continued

Appendix A - Description File Grammar Specification
This appendix shows an example of an Object-Action Manager description file syntax. Words in bold font represent key words in the description file language.

```
task_dialog_def:
    task_dialog identifier {task_dialog_guts selector_defs}
task_dialog_guts:
    label string
    help identifier
    task_monitor always | task_monitor never | task_monitor default
    buttons standard | buttons read_only | buttons repeatable_task
    ok callback func_name() | ok callback identifier    /* function | command */
    entry callback func_name() /* function */
    exit callback func_name() /* function */
selector_defs:  /*1 or more */
    static_text identifier { static_text_guts }
    toggle identifier { toggle_guts }
    push_button identifier { push_button_guts }
    text_edit identifier { text_edit_guts }
    selection_list identifier { selection_list_guts }
    addon_list identifier { addon_list_guts      addon_list_input_region }
    read_only_list identifier { read_only_list_guts }
    skip_line | skip_line number
    indent number
    new_column width number | new_column width *
    group identifier { group_guts selector_defs }
static_text_guts:
    label string
    visible true | visible false
    reset true | reset false
toggle_guts:
    label string
    help identifier
    default on | default off
    visible true | visible false
    gray true | gray false
    reset true | reset false
    callback func_name()    /* function */
push_button_guts:
    label string
    help identifier
    width number | width *
    visible true | visible false
    gray true | gray false
    reset true | reset false
    callback func_name() | callback string | callback identifier /*function | command | window */
text_edit_guts:
    label string
    default string
    format string
    help identifier
    width number | width *
    maxchars number
    optional true | optional false
    visible true | visible false
    textvisible true | textvisible false
    editable true | editable false
    reset true | reset false
    column identifier /* Addon list column mapping */
    callback func_name() | callback string /* function | command */
    choices { choices_guts }
choices_guts:
    label string
    help identifier
    data string1 string2 ... stringN /* UI variables allowed in strings */
    selected_Items string | selected_items number
    height number
    width number | width *
    entry callback func_name() /* function */
selection_list_guts:
    label string
    help identifier
    callback func_name()    /* function */
    height number
    width number | width *
    visible true | visible false
    optional true | optional false
    reset true | reset false
    multiselection true | multiselection false
    data string1 string2 ... stringN /* UI variables allowed in strings */
    selected_items selected_items_specs
    representation listbox | representation radiobuttons | representation toggles |
```

-continued

Appendix A - Description File Grammar Specification
This appendix shows an example of an Object-Action Manager description file syntax. Words in bold font represent key words in the description file language.

```
representation optionbutton
    column identifier    /* Addon list column mapping */
    listbox_columns
addon_list_guts:
    label string
    help identifier
    add callback func_name()      /* function */
    remove callback func_name()   /* function */
    height number
    width number | width *
    visible true | visible false
    optional true | optional false
    reset true | reset false
    modify_only true | modify_only false
    selected_items selected_items_specs
    data string1 string2 . . . stringN /* UI variables allowed in strings */
    listbox_columns
addon_list_input_region:
    input_region { input_region_selectors }
input_region_selectors:    /* 1 or more */
    text_edit identifier { text_edit_guts }
    selection_list identifier { selection_list_guts } /* Must be optionbutton */
    static_text identifier { static_text_guts }
    skip_line | skip_line number
    indent number
    new_column width number | new_column width *
    group identifier { input_region_selectors }
read_only_list_guts:
    label string
    help identifier
    height number
    width number | width *
    visible true | visible false
    reset true | reset false
    data string1 string2 . . . stringN /* UI variables allowed in strings */
    listbox_columns
selected_items_specs:    /*1 or more, intermixing legal*/
    string | number
listbox_columns:        /* 0 or more */
    attr identifier { listbox_column_guts }
listbox_column_guts:
    label string
    width number | width *
    justify left | justify right
    data string1 string2 . . . stringN /* UI variables allowed in strings */
    private
group_guts:
    label string
    border on | border off
    reset true | reset false
    visible true | visible false
Step Menu:
    step_menu_def:
        step_menu identifier { step_menu_guts steps }
    step_menu_guts:
        label string
        help identifier
        binding late | binding immediate
        task_monitor always | task_monitor never | task_monitor default
        prompt string
        ok callback func_name() | ok callback identifier /* function | command */
        entry callback func_name() /* function */
        exit callback func_name() /* function */
        abort callback func_name()   /* function */
    steps:         /* 2 or more */
        step identifier { step_guts }
    step_guts:
        label string
        help identifier
        do func_name() | do string | do identifier /* function | command | window */
        width number | width *
        gray true | gray false
        status_text string
        optional true | optional false
```

We claim:

1. A computer system comprising:

an object-action manager for building and operating a developer-defined user interface within predetermined parameters, the developer-defined user interface managing interaction between an end-user and an application created by a developer, the object-action manager further comprising parser means for reading a description file and creating data structures from the description file, the description file being created by the developer using a simple definition syntax, the parser means creates the data structures according to a late binding convention;

object-list builder means connected to the parser means for defining an object-list interface screen according to the predetermined parameters and the data structures created from the description file;

dialog-box builder means connected to the parser means for defining a task dialog interface screen and a step menu interface screen, both according to the predetermined parameters and the data structures created from the description file;

library means connected to the object-list builder means and the dialog-box builder means for storing and operating access functions used during operation of the developer-defined user interface; and display handler means connected to the object-list builder means, the dialog-box builder means and the library means, the display handler means for displaying at least one interface screen and managing interaction between the end-user and the application created by the developer.

2. The object-action manager as recited in claim 1, wherein the object-list interface screen comprises:

an object-list region which displays a set of objects and associated attributes, said object-list region accessible by the end-user and being scrollably viewable; and a menubar disposed above the object-list region and having action means and view means, both for manipulating the set of objects and associated attributes displayed on the object-list region.

3. The object-list interface screen as recited in claim 2, wherein the view means, which provides the end-user with a capability to manipulate the display of the set of objects and associated attributes for creating a customized view, comprises:

an attribute columns manipulator to adjust the display of attributes associated with the set of objects;

a filter to suppress at least one object so that said at least one object is not displayed; and a sorter to display the set of objects and associated attributes according to a selected criterium.

4. The object-action manager as recited in claim 1, wherein the task dialog interface screen comprises:

a control area having at least one pressable control button and being accessible by the end-user, said at least one pressable control button performs a predetermined action when pressed; and a task region disposed above the control area and having at least one selector, said task region providing a means for manipulating a selected object and associated attributes from the object-list interface screen upon said at least one control button being pressed.

5. The task dialog interface screen as recited in claim 4, wherein said at least one selector provides a means for accepting an input from the end-user, said input indicative of a manner in which to manipulate the selected object.

6. The task dialog interface screen as recited in claim 5, wherein said at least one selector comprises a text edit selector which accepts a textual string input.

7. The task dialog interface screen as recited in claim 5, wherein said at least one selector comprises a toggle selector having two opposing states switchable by the end-user.

8. The task dialog interface screen as recited in claim 5, wherein said at least one selector comprises a push button selector which is pressable by the end-user.

9. The task dialog interface screen as recited in claim 5, wherein said at least one selector comprises a selection list selector having a means to select at least one item from a list of items.

10. The task dialog interface screen as recited in claim 5, wherein said at least one selector comprises an add-on list selector which provides a list of objects and a means for manipulating the list.

11. The task dialog interface screen as recited in claim 4, wherein said at least one selector provides a means for displaying information indicative of the selected object.

12. The task dialog interface screen as recited in claim 11, wherein said at least one selector comprises a static text selector for displaying information to the end-user.

13. The task dialog interface screen as recited in claim 11, wherein said at least one selector comprises a read-only selector having at least one list of objects and scrollable means for reviewing said at least one list of objects.

14. The object-action manager as recited in claim 1, wherein the step menu interface screen comprises:

a control area having at least one pressable control button and being accessible by the end-user, said at least one control button performs a predetermined action when pressed;

a push button control area disposed above the control area and having at least push button selector pressable by the end-user, said at least one push button selector performs a predetermined task when pressed; and a static text region adjacent to the push button control area for displaying information to the end-user.

15. An object-action manager for creating and manipulating a high-level user interface for managing interaction between an end-user and a developer-defined application, comprising:

a parser for reading a description file and creating data structures for building user interface screens, said description file having screen definitions for user interface screens, said parser creates said data structures according to a late binding convention;

an object-list builder connected to the parser which receives the data structures from the parser, said object-list builder creates an object-list interface screen according to the data structures, the object-list interface screen having an object-list region and a menubar disposed above the object-list region, the object-list region displays a set of objects and associated attributes, said object-list region accessible by the end-user and being scrollably viewable, the menubar having view means for manipulating the set of objects and associated attributes displayed on the object-list region to create a customized view;

a dialog-box builder connected to the parser which receives the data structures from the parser, said dialog-box builder creates a task dialog interface screen and a step menu interface screen both according to the data structures, the task dialog interface screen having a first control area and a task region disposed above the first control area, the first control area having at least one pressable first control button accessible by the end-user, said at least one pressable first control button performs a predetermined action when pressed, the task region having at least one selector and a means for manipulating a selected object and associated attributes from the object-list interface screen, the step menu interface screen having a second control area with at least one pressable second control button accessible by the end-user, said at least one pressable second control button performs a predetermined action when pressed;

a library of access functions connected to the object-list builder and the dialog-box builder, said library having at least one subroutine for manipulating the end-user interface; and a display handler connected to the object-list builder, the dialog-box builder and the library of access functions, said display handler manages interaction between the end-user of the user interface and the object-action manager.

* * * * *